(12) United States Patent
Telfer et al.

(10) Patent No.: US 12,099,281 B2
(45) Date of Patent: Sep. 24, 2024

(54) METHOD OF AUTHENTICATING AN ELECTRO-OPTIC DEVICE AND ANY OF ITS COMPONENTS

(71) Applicant: E INK CORPORATION, Billerica, MA (US)

(72) Inventors: Stephen J. Telfer, Arlington, MA (US); Brian D. Bean, Newton, MA (US); Lynne C. Garone, Wayland, MA (US); Simon Pang, Acton, MA (US); Jay William Anseth, Canton, MA (US)

(73) Assignee: E Ink Corporation, Billerica, MA (US)

(*) Notice: Subject to any disclaimer, the term of this patent is extended or adjusted under 35 U.S.C. 154(b) by 0 days.

(21) Appl. No.: 18/129,365

(22) Filed: Mar. 31, 2023

(65) Prior Publication Data

US 2023/0251544 A1 Aug. 10, 2023

Related U.S. Application Data

(62) Division of application No. 16/935,541, filed on Jul. 22, 2020, now Pat. No. 11,762,257.
(Continued)

(51) Int. Cl.
*G02F 1/167* (2019.01)
*G02F 1/166* (2019.01)
(Continued)

(52) U.S. Cl.
CPC ............. *G02F 1/167* (2013.01); *G02F 1/166* (2019.01); *G02F 1/16757* (2019.01);
(Continued)

(58) Field of Classification Search
CPC ............. G02F 1/167; G02F 2001/1678; G02F 2202/28; G02F 1/1676; G02F 1/133305;
(Continued)

(56) References Cited

U.S. PATENT DOCUMENTS 3,897,284 A 7/1975 Livesay
4,418,346 A 11/1983 Batchelder
(Continued)

FOREIGN PATENT DOCUMENTS

CN 103834285 A 6/2014
JP 2005272832 A 10/2005
(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — Brandi N Thomas
(74) *Attorney, Agent, or Firm* — Ioannis Constantinides

(57) ABSTRACT

An electro-optic device comprises in order, an electrically-conductive light-transmissive layer, an electro-optic material layer, an adhesive layer, and a backplane substrate comprising a plurality of pixel electrodes configured to apply an electrical potential between the electrically-conductive light-transmissive layer and the pixel electrodes. An activation region, comprising an identification marker, is located in a layer of the electro-optic device and it emits radiation of a characteristic wavelength upon activation by a stimulus, enabling the identification of the manufacturing source and the manufacturing lot of the electro-optic device and its components. The technology is also relevant for a front plane laminate and a double release sheet, which are useful components for the manufacture of electro-optic devices.

5 Claims, 14 Drawing Sheets

Related U.S. Application Data

(60) Provisional application No. 62/891,486, filed on Aug. 26, 2019.

(51) Int. Cl.
    *G02F 1/1675*     (2019.01)
    *G02F 1/16757*    (2019.01)
    *G02F 1/1676*     (2019.01)

(52) U.S. Cl.
    CPC .... *G02F 1/1676* (2019.01); *G02F 2001/1678* (2013.01); *G02F 2201/121* (2013.01); *G02F 2202/046* (2013.01); *G02F 2202/28* (2013.01); *G02F 2203/01* (2013.01)

(58) Field of Classification Search
CPC ............... G02F 1/1679; G02F 1/1681; G02F 1/16757; G02F 1/1677; G02F 1/1339; G02F 2201/50; G02F 1/155; G02F 2202/022; G02F 1/172; G02F 1/0107; G02F 1/161; G02F 1/16755; G02F 1/1334; G02F 1/133354; G02F 1/1675; G02F 1/13338; G02F 1/133516; G02F 1/16766; G02F 1/1685; G02F 1/133514; G02F 1/1508; G02F 1/13306; G02F 1/1333; G02F 1/13336; G02F 1/133562; G02F 1/136209; G02F 1/136213; G02F 1/1533; G02F 2201/121; G02F 1/0018; G02F 1/061; G02F 1/133311; G02F 1/133368; G02F 1/133377; G02F 1/1345; G02F 1/136227; G02F 2203/01; G02F 1/0063; G02F 1/1323; G02F 1/1335; G02F 1/133723; G02F 1/13439; G02F 1/136286; G02F 1/166; G02F 2201/123; G02F 2201/42; G02F 2202/046; G02F 1/0027; G02F 1/0126; G02F 1/0147; G02F 1/133302; G02F 1/133382; G02F 1/133504; G02F 1/133606; G02F 1/1341; G02F 1/134336; G02F 1/1362; G02F 1/136218; G02F 1/1368; G02F 1/153; G02F 1/1673; G02F 1/19; G02F 1/29; G02F 2202/025; G02F 2202/10; G02F 2202/16; G02F 2203/60; G02F 2203/68; G02F 1/0102; G02F 1/0123; G02F 1/1309; G02F 1/1316; G02F 1/133308; G02F 1/133388; G02F 1/133394; G02F 1/133509; G02F 1/133526; G02F 1/133553; G02F 1/133567; G02F 1/133602; G02F 1/133707; G02F 1/133792; G02F 1/1343; G02F 1/134309; G02F 1/13452; G02F 1/13456; G02F 1/13458; G02F 1/1351; G02F 1/1391; G02F 1/141; G02F 1/1671; G02F 1/16756; G02F 1/292; G02F 2201/086; G09G 3/344; G09G 2310/06; G09G 2300/0426; G09G 2310/068; G09G 2310/08; G09G 2300/04; G09G 2310/061; G09G 2310/065; G09G 2320/0209; G09G 2354/00; G09G 3/3406; G09G 3/3446; G09G 3/3453; G09G 3/3696; G09G 3/38; G09G 2300/0408; G09G 2300/08; G09G 2310/027; G09G 2310/0289; G09G 2320/0219; G09G 2330/12; G09G 3/2011; G09G 3/3607; G09G 3/3648; G09G 3/3688; G02B 26/026; G02B 5/201; G02B 1/14; G02B 26/00; G02B 26/005; G02B 1/10; G02B 26/004; G02B 26/02; G02B 23/2407; G02B 26/08; G02B 27/30; G02B 27/46; G02B 5/208; G02B 5/22

See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,784,136 A | 7/1998 | Ando et al. |
| 5,808,783 A | 9/1998 | Crowley |
| 5,872,552 A | 2/1999 | Gordon, II et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,504,524 B1 | 1/2003 | Gates et al. |
| 6,517,618 B2 | 2/2003 | Foucher et al. |
| 6,531,997 B1 | 3/2003 | Gates et al. |
| 6,866,760 B2 | 3/2005 | Paolini, Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,119,772 B2 | 10/2006 | Amundson et al. |
| 7,144,942 B2 | 12/2006 | Zang et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,342,068 B2 | 3/2008 | Klingenberg et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,477,444 B2 | 1/2009 | Cao et al. |
| 7,535,624 B2 | 5/2009 | Amundson et al. |
| 7,561,324 B2 | 7/2009 | Duthaler et al. |
| 7,649,666 B2 | 1/2010 | Isobe et al. |
| 7,649,674 B2 | 1/2010 | Danner et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 7,918,395 B2 | 4/2011 | Gelbman |
| 8,009,348 B2 | 8/2011 | Zehner et al. |
| 8,441,713 B2 | 5/2013 | Kawashima et al. |
| 9,279,906 B2 | 3/2016 | Kang |
| 9,465,261 B2 | 10/2016 | Stahl et al. |
| 9,851,614 B2 | 12/2017 | Yasui et al. |
| 9,921,422 B2 | 2/2018 | Harris et al. |
| 10,204,798 B2 | 2/2019 | Jintyou et al. |
| 10,427,446 B2 | 10/2019 | Staub et al. |
| 10,444,553 B2 | 10/2019 | Laxton |
| 10,509,294 B2 | 12/2019 | Telfer |
| 10,983,410 B2 | 4/2021 | Widger et al. |
| 11,446,951 B2 | 9/2022 | Grof et al. |

(56) References Cited

U.S. PATENT DOCUMENTS

| | | | |
|---|---|---|---|
| 2007/0114366 A1* | 5/2007 | Wisnudel | G09F 3/0291 |
| | | | 250/221 |
| 2011/0292492 A1* | 12/2011 | Hsieh | G02F 1/1679 |
| | | | 156/64 |
| 2015/0005720 A1 | 1/2015 | Zang et al. | |
| 2015/0014553 A1 | 1/2015 | Lee et al. | |
| 2016/0012710 A1 | 1/2016 | Lu et al. | |
| 2016/0018845 A1 | 1/2016 | Kwak et al. | |
| 2017/0130053 A1* | 5/2017 | Wu | C08F 120/18 |
| 2017/0242313 A1* | 8/2017 | Eveborn | G02F 1/161 |
| 2017/0260413 A1 | 9/2017 | Sempere et al. | |

FOREIGN PATENT DOCUMENTS

| | | |
|---|---|---|
| JP | 2007233055 A | 9/2007 |
| JP | 2011203317 A | 10/2011 |
| KR | 20120134066 A | 12/2012 |
| TW | 200930177 A | 7/2009 |
| WO | 2000036560 A1 | 6/2000 |
| WO | 2008119708 A2 | 10/2008 |
| WO | 2017134660 A1 | 8/2017 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, Udo et al., "Nanomaterials-Based Electrochromics for Paper-Quality Displays", Adv. Mater, vol. 14, No. 11, pp. 845-848, (Jun. 5, 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). 2001.

Yamaguchi, Y. et al., "Toner display using insulative particles charged triboelectrically", Asia Display/IDW '01, pp. 1729-1730, Paper AMD4-4 (2001). 2001.

Korean Intellectual Property Office, PCT/US2020/043060, International Search Report and Written Opinion, Oct. 26, 2020. Oct. 26, 2020.

European Patent Office, Extended European Search Report, EP Appl. No. 20859426.7, Jul. 17, 2023.

* cited by examiner

METHOD OF AUTHENTICATING AN ELECTRO-OPTIC DEVICE AND ANY OF ITS COMPONENTS

CROSS-REFERENCE TO RELATED APPLICATIONS

This application is a divisional application of patent application Ser. No. 16/935,541, filed on Jul. 22, 2020 (Publication No. 2021/0063837 A1), which claims priority to U.S. Provisional Patent Application No. 62/891,486 filed on Aug. 26, 2019. The entire contents of these applications are incorporated by reference in their entireties.

FIELD OF THE INVENTION

This invention relates to an electro-optic device comprising an activation region having an identification marker that emits radiation of a characteristic wavelength upon activation by a stimulus. The invention enables the authentication of the manufacturing source and the identification of the manufacturing lot of the electro-optic device and its components at any time during the life of the electro-optic device.

The term "electro-optic", as applied to a material or a device or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range. Hereinafter, the terms "electro-optic device" and "electro-optic display" are used interchangeably and are considered synonymous.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme that only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays" or "solid electro-optic devices". Thus, the term "solid electro-optic displays" or "solid electro-optic devices" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071; 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 333, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038, 6,870,657, and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), F Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921; and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552, 6,130,774, 6,144,361, 6,172,798, 6,271,823, 6,225,971 and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes: electrophoretic deposition (See U.S. Pat. No. 7,339,715); and other similar techniques. Thus, the resulting display can be flexible. Further, because the display medium can be printed (using a variety of methods), the display itself can be made inexpensively.

Other types of electro-optic materials may also be used in the present invention. Of particular interest, bistable ferroelectric liquid crystal displays (FLC's) are known in the art.

Other types of electro-optic media may also be used in the displays of the present invention.

An electro-optic device typically comprises a layer of electrophoretic material and at least two other layers disposed on opposed sides of the electrophoretic material, one of these two layers being an electrode layer. In most such devices both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. A very similar process can be used to prepare an electrophoretic display usable with a stylus or similar movable electrode by replacing the backplane with a simple protective layer, such as a plastic film, over which the stylus or other movable electrode can slide. In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, (a) a light-transmissive electrically-conductive layer; (b) a layer of a solid electro-optic; (c) an adhesive layer; and (d) a release film. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate, if present; in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release film. Another form of the double release sheet comprises a layer of a solid electro-optic medium sandwiched between two release films. Both forms of the double release sheet are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate" which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release film. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

A further complication in driving electrophoretic displays is the need for so-called "DC balance". As discussed in U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A drive method, which does result in zero net time-averaged applied electric field across the electro-optic medium, is conveniently referred to as a "direct current balanced" or "DC balanced".

As already noted, an encapsulated electrophoretic medium typically comprises electrophoretic capsules disposed in a polymeric binder, which serves to form the discrete capsules into a coherent layer. The continuous phase in a polymer-dispersed electrophoretic medium and the cell walls of a microcell medium serve similar functions. It has been found by E Ink researchers that the specific material used as the binder in an electrophoretic medium can affect the electro-optic properties of the medium. Among the electro-optic properties of an electrophoretic medium affected by the choice of binder is the so-called "dwell time dependence", as discussed in the U.S. Pat. No. 7,119,772 (see especially FIG. 34 and the related description). It has been found that, at least in some cases, the impulse necessary for a transition between two specific optical states of a bistable electrophoretic display varies with the residence time of a pixel in its initial optical state, and this phenomenon is referred to as "dwell time dependence" or "DTD". Obviously, it is desirable to keep DTD as small as possible, since DTD affects the difficulty of driving the display and may affect the quality of the image produced; for example, DTD may cause pixels which are supposed to form an area of uniform gray color to differ slightly from one another in gray level, and the human eye is very sensitive to such variations. Although it has been known that the choice of binder affects DTD, choosing an appropriate binder for any specific electrophoretic medium has hitherto been based on trial-and-error, with essentially no understanding of the relationship between DTD and the chemical nature of the binder.

U.S. Patent Application Publication No. 2005/0107564 describes an aqueous polyurethane dispersion comprising a polyurethane polymer comprising the reaction product of: (a) an isocyanate terminated prepolymer comprising the reaction product of (i) at least one polyisocyanate comprising α, α, α, α-tetramethylxylene diisocyanate [systematic name 1.3-bis(1-isocyanato-1-methylethyl)benzene; this material may hereinafter be called "TMXDI"]; (ii) at least one difunctional polyol comprising polypropylene glycol, and (iii) an isocyanate reactive compound comprising an acid functional group and at least two isocyanate reactive groups selected from a hydroxy, a primary amino, a secondary amino, and combinations thereof; (b) a neutralizing agent comprising a tertiary amino group; (c) a monofunctional chain terminating agent; (d) a chain extending agent comprising an organic diamine; and (e) water. This polyurethane dispersion, which may hereinafter be called the "TMXDI/PPO" dispersion, has been found to be useful as a lamination adhesive in electro-optic displays.

The discussion below focuses on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements, where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in the aforementioned "Methods for driving displays" applications, to use more than one drive scheme simultaneously in different areas of the same display, and a set of drive schemes used in this manner may be referred to as "a set of simultaneous drive schemes."

One need in the field of electronic devices is the identification of the manufacturing source and lot of such devices and their components in order to troubleshoot and solve quality problems at any time during the life of the device. The present invention seeks to provide the appropriate tools to satisfy this need in an efficient and effective manner.

SUMMARY OF THE INVENTION

Accordingly, in one aspect, this invention provides an electro-optic device comprising, in order, (a) an electrically-conductive light-transmissive layer, (b) an electro-optic material layer, (c) an adhesive layer, and (d) a backplane substrate comprising a plurality of pixel electrodes configured to apply an electrical potential between the electrically-conductive light-transmissive layer and the pixel electrodes, wherein the electro-optic device comprises an activation region having an identification marker that emits radiation of a characteristic wavelength profile upon activation by a stimulus, and wherein the activation region is located within or adjacent to one of the layers of the electro-optic device.

In another aspect this invention provides a front plane laminate comprising, in order, (a) an electrically-conductive light-transmissive layer, (b) an electro-optic material layer, (c) an adhesive layer, and (d) a release film, wherein the front plane laminate comprises an activation region having an identification marker that emits radiation of a characteristic wavelength profile upon activation by a stimulus, wherein the activation region is located within or adjacent to one of the layers of the front plane laminate.

In another aspect this invention provides a double release sheet, useful in the manufacture of electro-optic devices, comprising in order (a) a first release film, (b) a first adhesive layer, (c) an electro-optic material layer, (d) an adhesive layer, and a second release film, wherein the double release sheet comprises an activation region having an identification marker that emits radiation of a characteristic wavelength profile upon activation by a stimulus, and wherein the activation region is located within or adjacent to one of the layers of the double release sheet.

In another aspect, this invention provides a method of authenticating an electro-optic device and any of its components, comprising the steps of (a) providing an electro-optic device comprising, in order, an electrically-conductive light-transmissive layer, an electro-optic material layer, an adhesive layer, and a backplane substrate comprising a plurality of pixel electrodes configured to apply an electrical potential between the electrically-conductive light-transmissive layer and the pixel electrodes, wherein the electro-optic device comprises an activation region having an identification marker that emits radiation of a characteristic wavelength profile upon activation, and wherein the activation region is located within or adjacent to one of the layers of the electro-optic device, (b) activating the identification marker by a stimulus, (c) detecting the emitted electromagnetic radiation caused by the identification marker, and (d) determining the authenticity of the device or any of its components or determining the manufacturing lot of the electro-optic device or any of its components.

DETAILED DESCRIPTION OF THE INVENTION

Figure 1A:
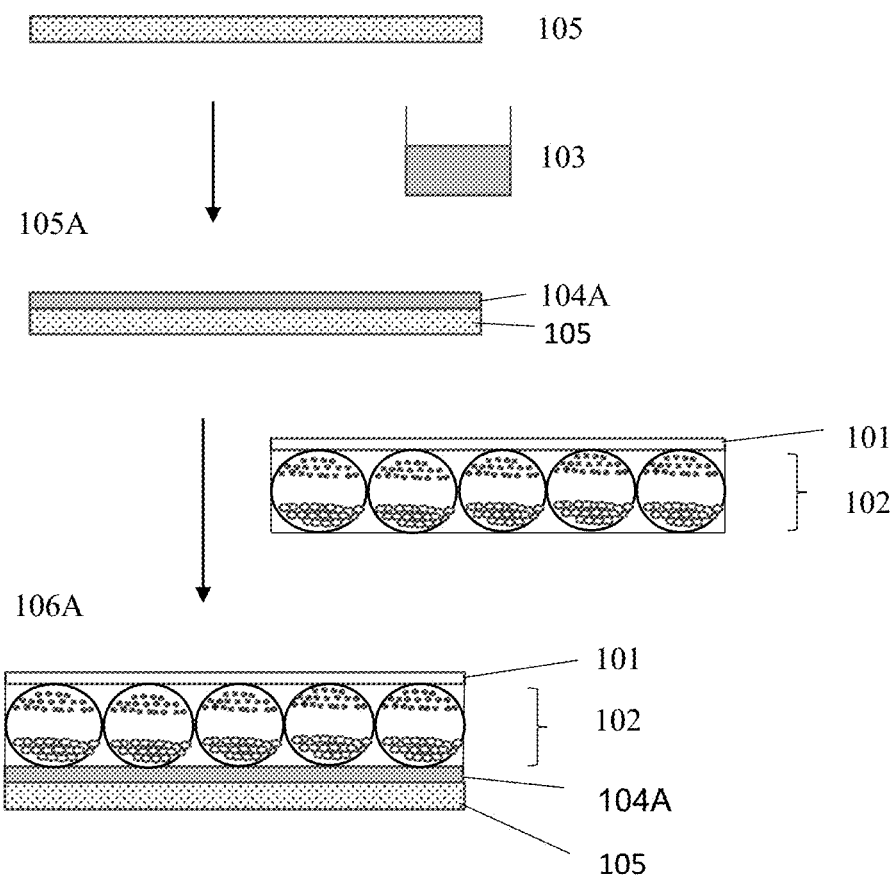
FIGS. 1A and 1B of the accompanying drawings is an illustration of an example of an electro-optic device having an identification marker in the adhesive layer. An example of the steps of the process of making such device from a front plane laminate is graphically described, FIG. 2A to 2E of the accompanying drawings is an illustration of another example of an electro-optic device having an identification marker in the adhesive layer. An example of the steps of the process of making such device from a double release sheet is graphically described.

The present invention provides an electro-optic device, which comprises an activation region having an identification marker in one of its layers, enabling the identification of the manufacturing source of the device and its components. The technology also enables the identification of the manufacturing lot of the electro-optic device and its components at any time during the life of the device.

The electro-optic device of the present invention comprises, in order, an electrically-conductive light-transmissive layer, an electro-optic material layer, an adhesive layer, and a backplane substrate comprising a plurality of pixel electrodes configured to apply an electrical potential between the electrically-conductive light-transmissive layer and the pixel electrodes. The electro-optic device comprises an activation region having an identification marker that emits radiation of a characteristic wavelength profile upon activation by a stimulus, and wherein the activation region is located in one of the layers of the electro-optic device.

A common method of manufacturing electro-optic devices involves the use of front plane laminate (FPL), which comprises, in order, an electrically-conductive light-transmissive layer, an electro-optic material layer, an adhesive layer, and a release film. A FPL can be produced at one location and stored or shipped to another location. It can be used for the manufacturing of the corresponding electro-optic device when and where needed. The release film may be simply removed, exposing the adhesive layer and enabling the manufacturer to simply attach the backplane substrate to obtain the electro-optic device. The incorporation of an activation region having an identification marker in one of the layers of FPL enables the authentication of the manufacturing source and the identification of the manufacturing lot of the FPL at any time during the life of the FPL and the resulting electro-optic device.

Another method of manufacturing electro-optic devices involves the use of double release sheet, which comprises, in order, a first release film, a first adhesive layer, an electro-optic material layer, an adhesive layer; and a second release film. A double release film can be produced at one location and stored or shipped to another location. It can be used for the manufacturing of the corresponding electro-optic device when and where needed. The first release film can be removed, exposing the first adhesive layer and enabling the manufacturer to attach an electrically-conductive light-transmissive layer. Then, the second release film can be removed, exposing the second adhesive layer and enabling the manufacturer to simply attach the backplane substrate onto it to obtain the electro-optic device. The incorporation of an activation region having an identification marker in one of the layers of a double release sheet enables the authentication of the manufacturing source and the identification of the manufacturing lot of the double release sheet at any time during the life of the double release sheet and the resulting electro-optic device.

The term "light" as used herein is electromagnetic radiation of any wavelength and not only of the visible spectrum.

The ideal activation region and the corresponding identification marker have the following features:
  i. It should be easily detectable either via a visual inspection or via the use of an analytical instrument;
  ii. It should not significantly interfere with the operation or the appearance of the electro-optic device.

The identification marker may be a fluorescent dye, a fluorescent pigment, a phosphorescent dye, a phosphorescent pigment or a mixture thereof.

The identification marker may comprise a fluorescent dye or a combination of two or more fluorescent dyes. The identification marker may also comprise a fluorescent pigment or a combination of fluorescent pigments. The identification marker may also comprise a combination of a fluorescent dye and a fluorescent pigment. A fluorescent dye or a fluorescent pigment is a compound that absorbs light and re-emits it at a different wavelength. Typically, the emitted wavelength is longer than that of the incident light.

A dye is a material that is soluble in the medium of the composition in which it is used. On the contrary, a pigment is a material that is insoluble in the medium of the compositions in which it is used and it is present as a solid.

The identification marker may comprise a phosphorescent dye or a combination of two or more phosphorescent dyes. The identification marker may also comprise a phosphorescent pigment or a combination of phosphorescent pigments. The identification marker may also comprise a combination of a phosphorescent dye and a phosphorescent pigment. A phosphorescent dye or a phosphorescent pigment is a compound that absorbs light and re-emits it at a different wavelength, wherein the emission takes place over a period of time after exposure to light that is typically longer than the case of fluorescence.

Fluorescent and phosphorescent dyes and pigments, which can be collectively called luminescent dyes and pigments, may be members of the acridine, cyanine, fluorone, luciferin, oxazine, phenanthridine, and rhodamine chemical classes. Non-limiting examples of luminescent dyes and pigments are acridine orange, acridine yellow, acriflavine, GelGreen, Cy2, Cy3, Cy3.5, Cy5, Cy5.5, Cy7, Cy7.5, DiI, DiOC6, heptamethine dyes, indocyanine green, merocyanine, SYBR Green I, SYBR Safe, Sytox, YOYO-1, calcein, carboxyfluorescein diacetate N-succinimidyl ester, carboxyfluorescein N-succinimidyl ester, dichlorofluorescein, 6-carboxyfluorescein, eosin Y, eosin B, erythrosine, fluo-3, fluo-4, fluorescein, fluorescein amidite, fluorescein isothiocyanate, Indian yellow, merbromin, Pacific Blue, phloxine B, seminaphtharhodafluor, coelenterazine, firefly luciferin, vargulin, brilliant cresyl blue, cresyl violet, gallocyanin, Nile blue, Nile red, resazurin, ethidium bromide, GelRed, propidium iodide, rhodamine 6G, rhodamine B, rhodamine 123, sulforhodamine 101, Texas red, and sulforhodamine B.

The activation region may be located in the adhesive layer of the electro-optic device, or the FPL, or it may be located adjacent to the adhesive layer. In the case of a double release sheet, the activation region may be located in any of the adhesive layers or it may be located adjacent to one or both the adhesive layers. For example, the identification marker of the activation region may be part of a coating, which is in contact with the adhesive layer. The activation region may form an image, which comprises a letter, a number or combination thereof.

Figure 1B:
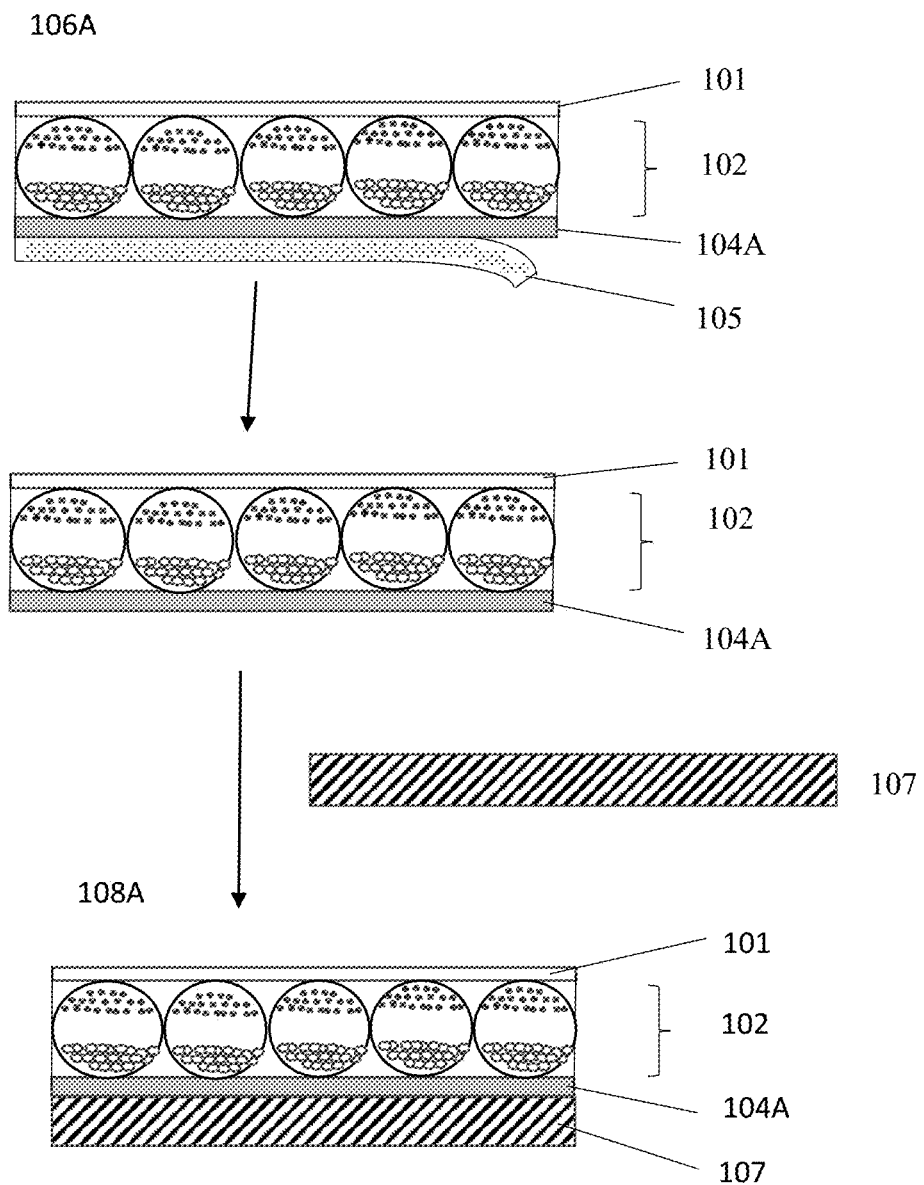

In a variant of the present invention, the activation region is in the adhesive layer. More specifically, the identification marker may be combined with the adhesive material before the application of the adhesive material on the electro-optic material layer to create the adhesive layer. FIGS. 1A and 1B provide an illustration of a FPL and an electro-optic device having an identification marker in the adhesive layer. FIGS. 1A and 1B also provide an example of the different steps of the process of making a FPL and an electro-optic device having an identification marker in the adhesive layer. More specifically, FIG. 1A is an example of a process of making an FPL. The identification marker is mixed with the adhesive material to make a combination of adhesive material and identification marker. This combination is represented by 103. Then, the combination of adhesive material and identification marker 103 is coated on a film 105 to form an adhesive film 105A. The adhesive film is then applied onto an article of manufacture, which comprises an electrically-conductive light-transmissive layer 101 and an electro-optic material layer 102. Thus, an adhesive layer 104A on the electro-optic material layer 102 is formed, which is in contact with the film 105, which serves as a release layer.

The resulting FPL 106A comprises an identification marker, which enables the authentication of the manufacturing source and the identification of the manufacturing lot of the FPL and the resulting electro-optic device.

The front plane laminate (FPL) is an article that may be used immediately for the manufacturing of electro-optic devices or it can be stored, transported and later used for the manufacturing of electro-optic devices, as illustrated in FIG. 1B. More specifically, the release film may be removed from FPL 106A and the FPL may be attached onto a surface of backplane substrate 107 to complete the process of making of the electro-optic device 108A. The backplane substrate comprises a plurality of pixel electrodes and drive means arranged to apply variable potentials to the pixel electrodes.

The resulting electro-optic device 108A comprises an identification marker, which enables the authentication of the manufacturing source and the identification of the manufacturing lot of the electro-optic device.

Figure 2A:
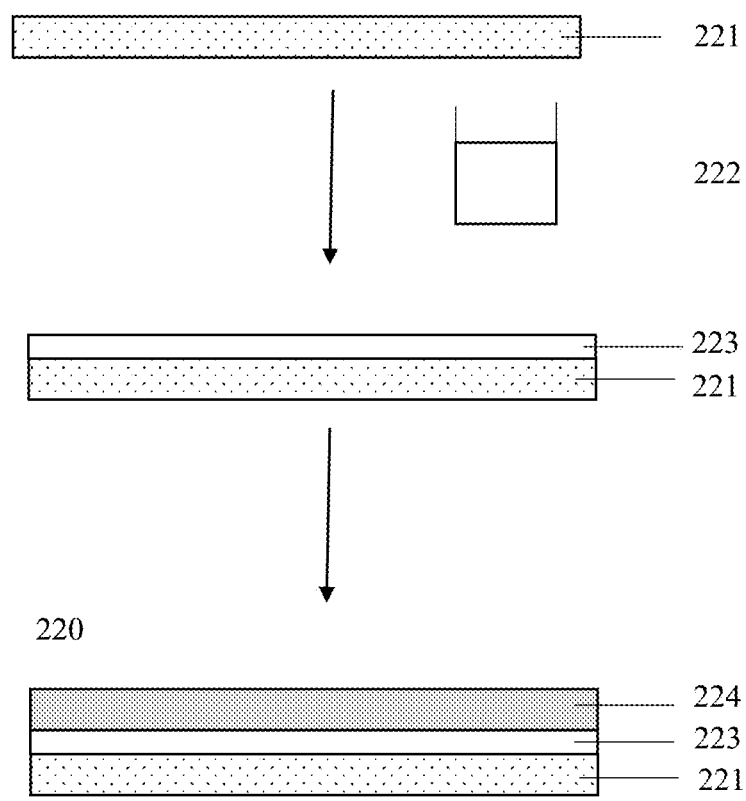
Figure 2B:
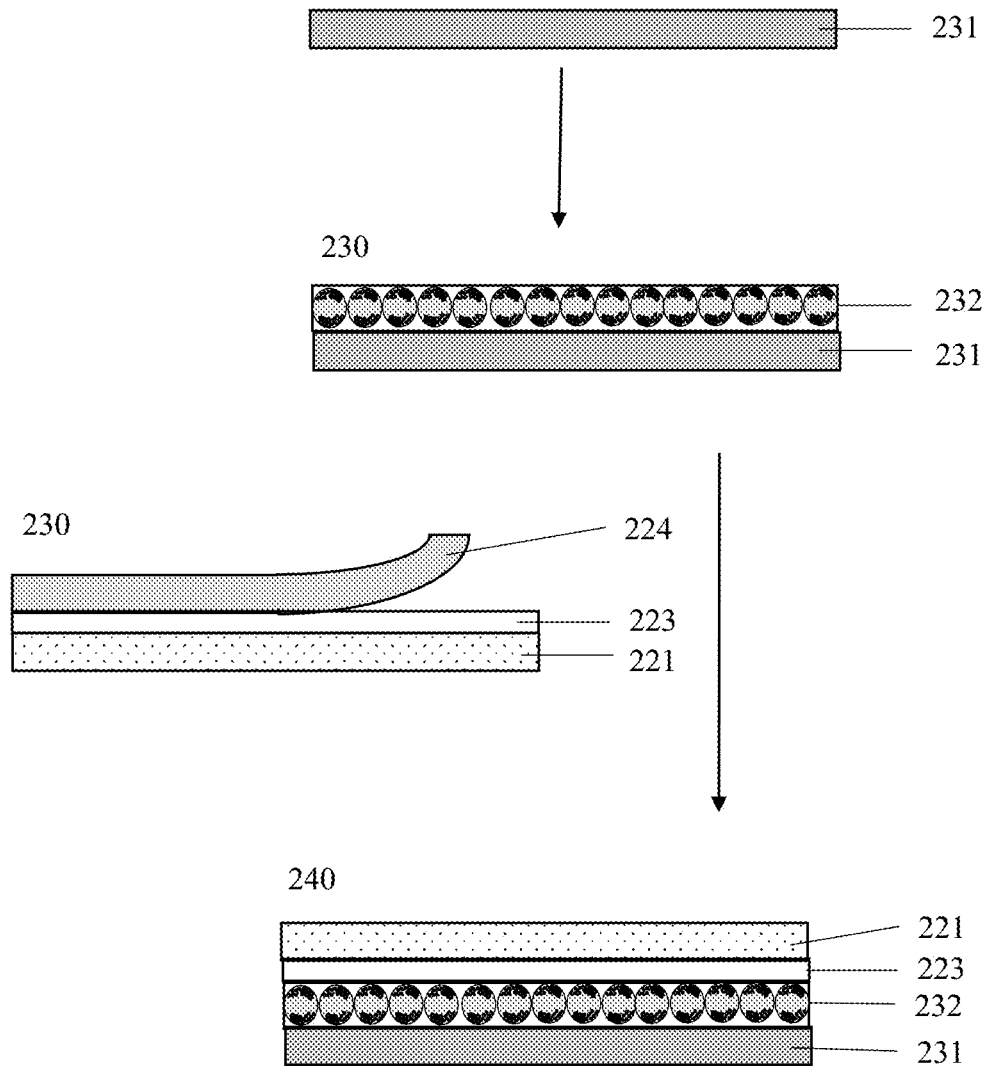
Figure 2C:
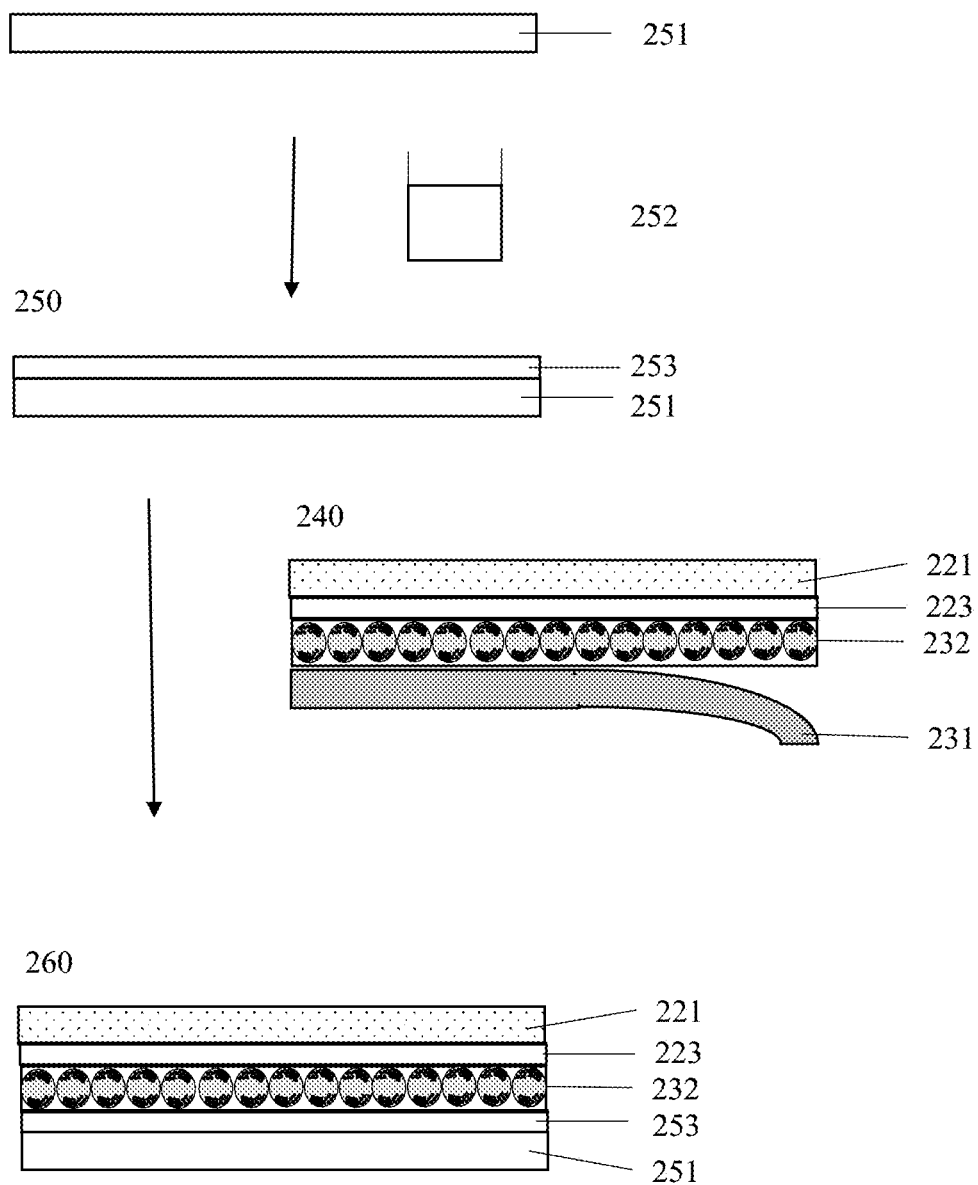

In another variant of the present invention, the activation region of a double release sheet is located in an adhesive layer of the double release sheet (and of the resulting electro-optic device). FIGS. 2A to 2E provide an example of a process of manufacturing of an electro-optic device according to the present invention. The inventive device comprising an activation region is represented as 290 in FIG. 2E. An example of a double release sheet that comprises an activation region in an adhesive layer is represented as 260 in FIG. 2C. FIGS. 2A, 2B and 2C provide an example of the steps of the process of making a double release sheet according to the invention. The identification marker may be combined with adhesive material before the application on first release film 221. The combination of adhesive material and the identification marker forms the first adhesive composition 222. Application of the first adhesive composition 252 onto the first release film 221 forms the first adhesive layer 223 on the first release film 221. Subsequently, a third release film 224 is placed on the first adhesive layer 223 to form a first release roll 220. In a separate step illustrated in FIG. 2B, an electro-optic material composition is coated onto a fourth release film 231 to form structure 230. After releasing the third release film 224 from the first release roll 220 and contacting the exposed first adhesive layer 223 with the electro-optic material layer 232 of structure 230, an intermediate electro-optic web 240 is formed. The intermediate electro-optic web 240 can be used to form a double release sheet 260, as illustrated in FIG. 2C. A second adhesive composition 252 is applied onto a second release film 251 to form a second adhesive layer 253, which is part of a second release roll 250. The second adhesive composition 252 may be made by mixing an identification marker with an adhesive material, After releasing the fourth release film 231 from the intermediate electro-optic web 240 and contacting the exposed surface of the electro-optic material layer 232 with the second adhesive layer 253 of the second release roll 250, the double release sheet 260 is formed. The identification marker may be included in one of the adhesive layers 223 or 253. The identification market may be included in both the first adhesive layer 223 and the second adhesive layer 253. In the latter case, the first adhesive layer 223 may comprise a different identification marker or a different combination of identification markets from the identification marker (or the combination of identification markers) comprised in the second adhesive layer 253 of the double release sheet.

Figure 2D:
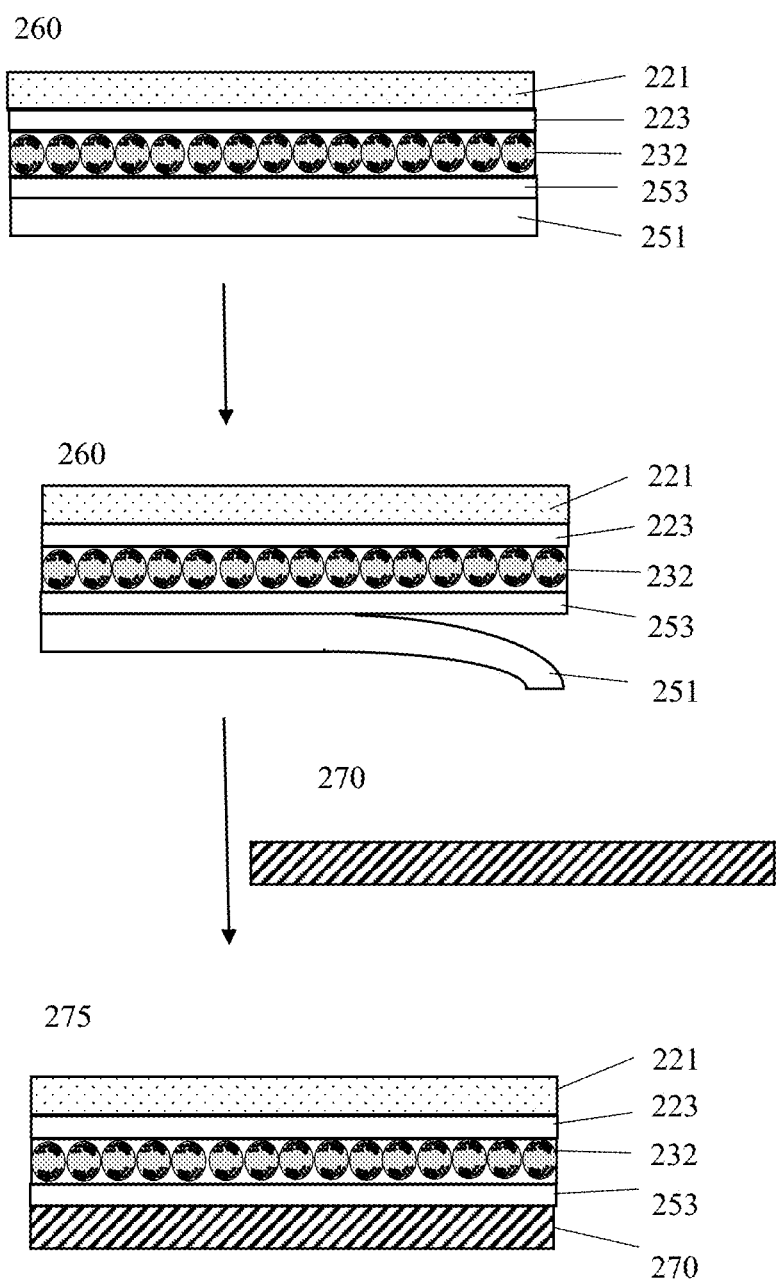
Figure 2E:
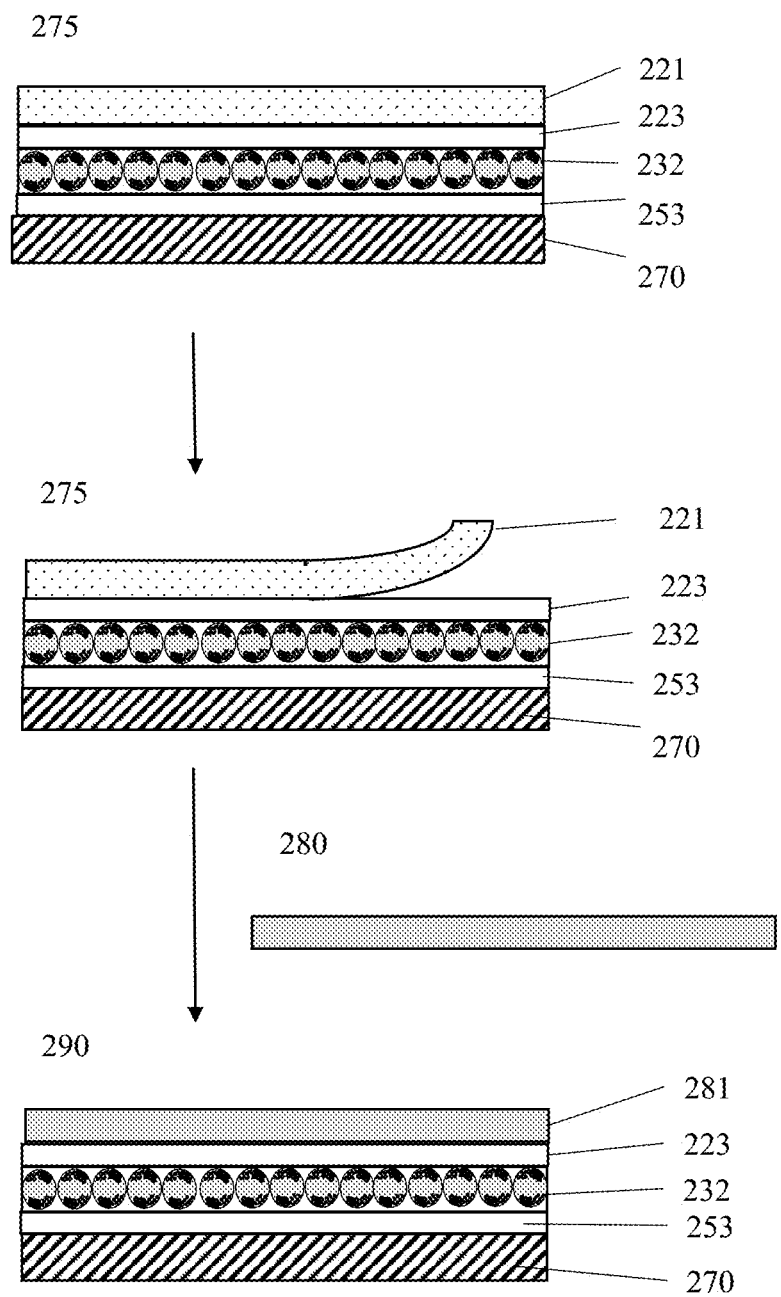

The double release sheet 260 that comprises one or more identification markers in one or both its adhesive layers can be stored and used at later time for the production of an electro-optic device. FIGS. 2D and 2E illustrate an example of the steps of the process of making an electro-optic device using the double release sheet. The second release film 251 of the double release sheet 260 is removed and a backplane substrate 270 is connected onto the exposed surface of the second adhesive layer 253 to form structure 275. Then, the first release film 221 from structure 275 is removed and the exposed first adhesive layer 223 is connected to a light-transmissive electrically conductive electrode 280 to form an electro-optic device 290 comprising a light-transmissive electrically conductive electrode layer 281. The attachment of the light-transmissive electrically conductive electrode 280 to the double release sheet may be performed before the attachment of the backplane substrate 270. The resulting electro-optic device 290 comprises at least one identification marker (or a combination of identification marker) in at least one of its adhesive layers, as the double release sheet form which it was made from. The identification marker or the combination of identification markers enable the authentication of the manufacturing source and the identification of the manufacturing lot of the electro-optic device.

The authentication of the manufacturing source and/or the identification of the manufacturing lot of the electro-optic device may be performed by illuminating the surface of the backplane substrate with light (stimulus), which causes the identification marker to emit radiation of a characteristic wavelength profile that is visible or measurable from the outside surface of the backplane substrate. Thus, visual inspection or spectroscopic determination of the emitted radiation of the characteristic wavelength profile from the backplane substrate can determine the authenticity (or not) of the electro-optic device. Despite the presence of pixel electrodes in it, the backplane substrate is usually (or it can be designed to be) at least partially light-transmissive to ultraviolet, visible and near infrared radiation, making viable the process of the authentication of the manufacturing source and/or the identification of the manufacturing lot of the electro-optic device. Even in the cases of opaque backplane substrates (in terms of the above-mentioned regions of the electromagnetic spectrum), the authentication of the manufacturing source and/or the identification of the manufacturing lot can be achieved by the separation of the backplane substrate from the rest of the device, authenticating the manufacturing source and/or identifying the manufacturing lot of the device and re-connecting the backplane substrate with the rest of the device, if needed. Alternatively, the authentication and/or identification can be achieved by using identification markers that do not depend on ultraviolet, visible or near infrared radiation. Identification markers, which provide a characteristic response to higher energy radiation, such as x rays or gamma rays, may be used.

In a variant of the present invention, the activation region is adjacent to the adhesive layer. More specifically, the activation region may be a coating on a layer of the electro-optic device, which is in contact with the adhesive layer. The activation region may be a coating (a) on the electro-optic material layer, (b) on the film that forms the release layer (created before the coating of the adhesive composition on it), or (c) on the backplane substrate. In the case of FPL, the activation region may be a coating on (a) the electro-optic material layer, (b) on the adhesive layer, the coating created before the attachment of the first release film, or (c) on the release film. In the case of double release sheet, the activation region may be a coating (a) on the backplane substrate, (b) on the first adhesive layer, the coating created before the attachment of the first release film, (c) on the first release film, (d) on the second adhesive layer, the coating created before the attachment of the second release film, (e) on the first release film, or (f) on the second release film.

Figure 3A:
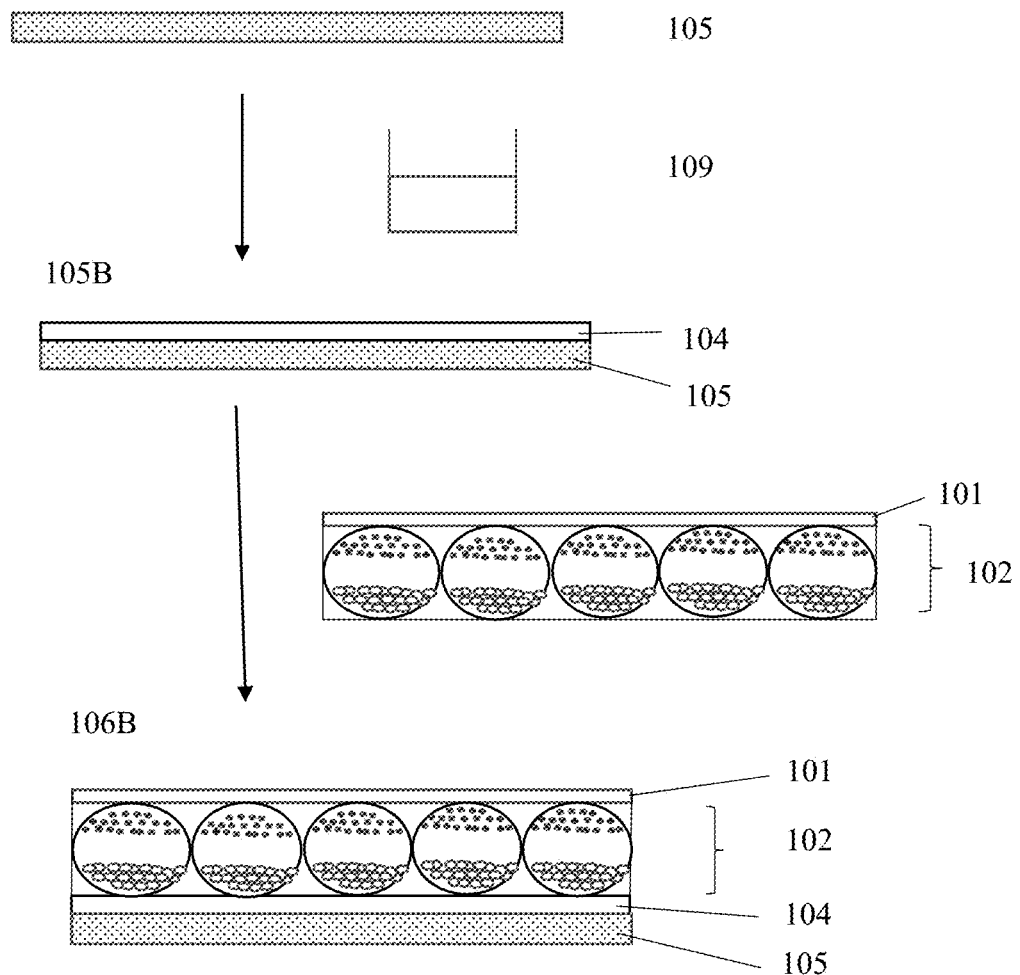
FIGS. 3A, 3B and 3C is an illustration of an electro-optic device having an activation region, which is a coating on the backplane substrate. An example of the different steps of the process of making such device from a front plane laminate are graphically described.
Figure 3B:
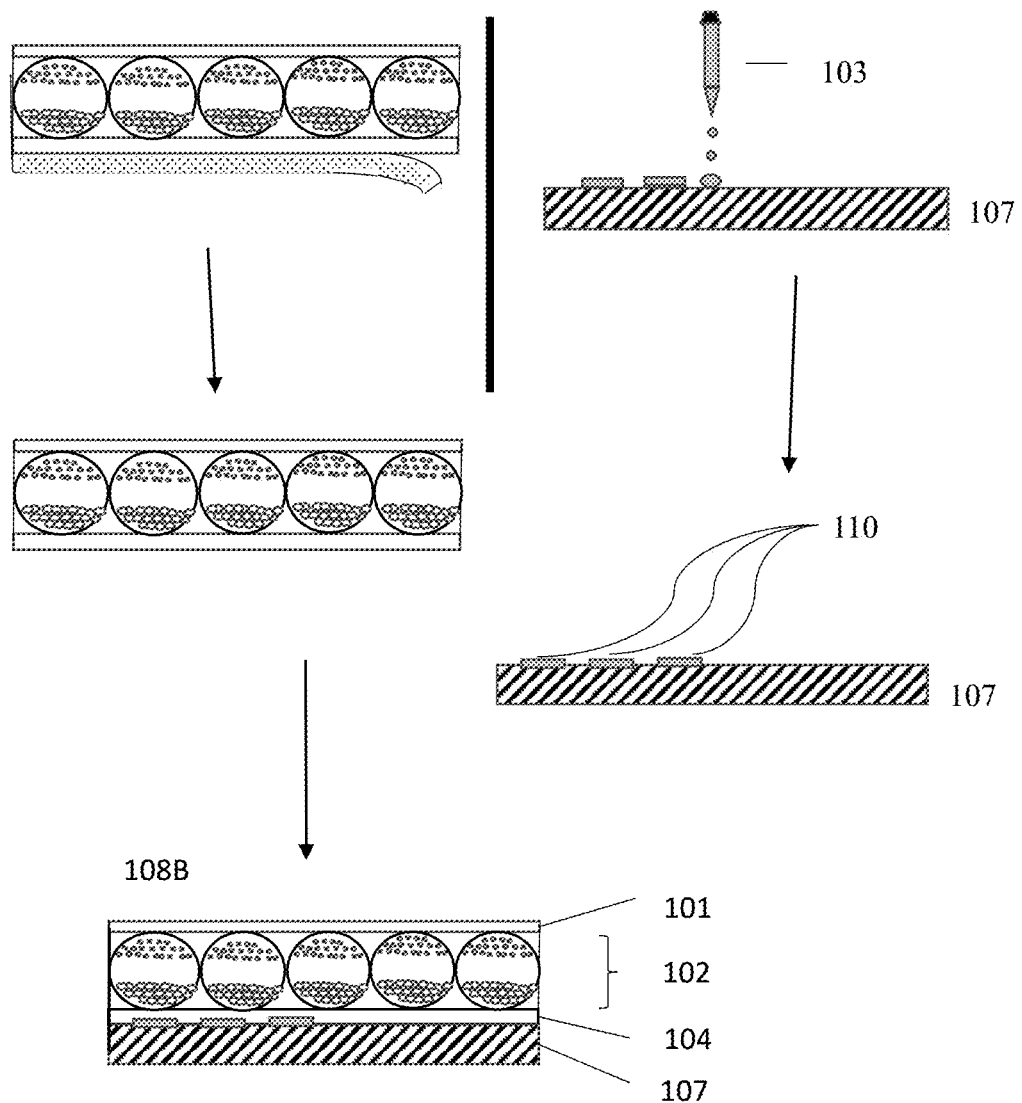

The identification marker itself or a solution of the identification marker or a dispersion of the identification marker may be used for the coating. The coating may also comprise a film forming polymer. FIGS. 3A and 3B provide an illustration of a FPL and an electro-optic device using the FPL. An activation region is a coating on the backplane substrate. FIG. 3A is an example of a process of making an FPL. An adhesive material 109 is applied on a film 105 to create an adhesive film 105B. The adhesive film is then applied onto the electro-optic material layer 102. The electro-optic material layer is in contact with an electrically-conductive light-transmissive layer 101. Using this process a FPL 106B is formed. This is an article that may be used immediately for the manufacturing of electro-optic devices or it can be stored, transported and later used for the manufacturing of electro-optic devices, as illustrated in FIG. 3B. More specifically, the release film may be removed from the FPL 106B and the FPL may be attached onto a backplane substrate 107 to complete the process of making of the electro-optic device 108B. In this example, the backplane substrate has been pre-coated with a composition comprising the identification marker 103. The activation region, which is the coating 110 can be performed using any coating technique such as pre-metered coatings such as patch die coating, slot or extrusion coating, slide or cascade coating, curtain coating, roll coating such as knife over roll coating, forward and reverse roll coating, stamping, gravure coating, flexography, dip coating, spray coating, meniscus coating, spin coating, brush coating, air knife coating, silk screen printing processes, electrostatic printing processes, thermal printing processes, ink jet printing processes, and other similar techniques.

Figure 3C:
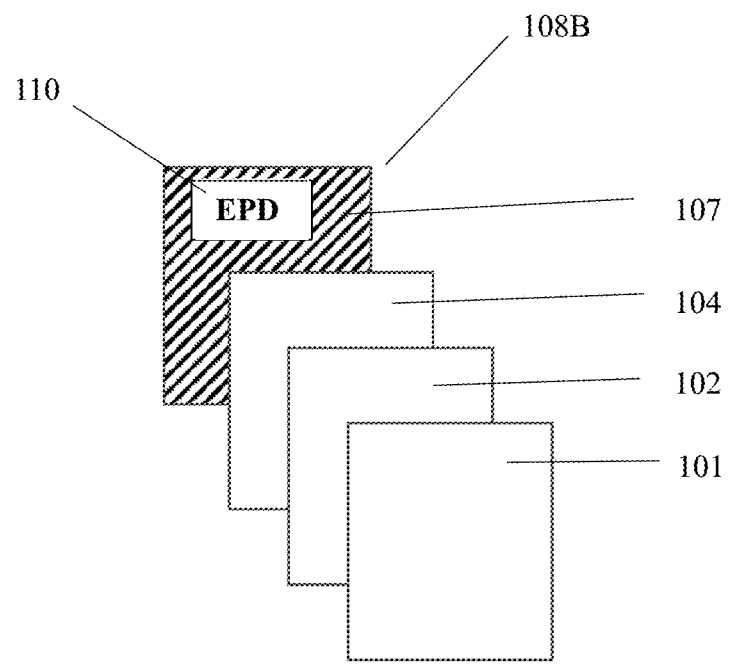

FIG. 3C provides an illustration of the electro-optic device 108B viewed from the upper surface of the electro-optic device from the side where the electrically-conductive light-transmissive layer is located. The activation region 110 is on the backplane substrate and in contact with the adhesive layer 104. The activation region forms an image comprising letters ("EPD").

There is a variety of scenarios of how the methodology can be used for authentication of the manufacturing source and the identification of the manufacturing lot of FPLs, double release sheets, and electro-optical devices. As mentioned above, an identification marker, such as a fluorescent dye or pigment, providing an emission of a characteristic wavelength profile (upon activation by a stimulus) may be mixed in the adhesion material before the formation of an adhesive layer of a FPL or a double release sheet. The emission may be visually observed or determined spectrometrically. Multiple fluorescent and/or phosphorescent dyes at different ratios may be used, making the emission profile more complex and enabling the coding of additional information that can be detected during the lifetime of the FPL, the double release sheet, or the electro-optic device. That is, the wavelength peaks and light amplitudes at the peaks, which depend on the nature of the dyes and amount ratios of the dyes may code a variety of information, such as manufacturing site, manufacturing time, manufacturing lot, source of material, etc.

The identification marker may also be coated on one or more of the various layer surfaces of the FPL, the double release sheet, or the electro-optic device. As described above, a coating enables additional flexibility by allowing the creation of various images that may detected upon activation. These images may include numbers and letters that may correspond to manufacturing lots and other specific information of the FPL, the double release sheet, or the electro-optic device. In the case of FPL and the corresponding electro-optic device, the activation region may be the result of a coating (a) on the electro-optic material layer before the attachment of the adhesive layer, (b) on the surface of the film that forms the release layer before the coating of the adhesive composition on it, or (c) on the backplane substrate before the attachment of the adhesive layer of the FPL. In option (b), the activation region remains at least partially on the surface of the adhesive layer after the removal of the release film. In addition, various identification markers, such as fluorescent dyes, may be included in the same FPL and electro-optic device at various locations, making the emitted light more complex and able to encode more information for the electro-optic device, the FPL, and their components. In the case of double release sheet and the corresponding electro-optic device, the activation region may be a coating (a) on the backplane substrate, (b) on the first adhesive layer, the coating created before the attachment of the first release film, (c) on the first release film, (d) on the second adhesive layer, the coating created before the attachment of the second release film, (e) on the first release film, or (f) on the second release film.

Various stimuli may be used to activate the identification marker, such as electromagnetic radiation (a) in the visible and near infrared region of the electromagnetic spectrum, having wavelength from about 400 mu to about 1000 nm, (b) in the ultraviolet region of the electromagnetic spectrum, having wavelength from about 200 nm to about 400 nm, (c) in the x ray region of the electromagnetic spectrum, having wavelength from about 0.01 nm to about 10 nm, and (d) in the gamma ray region of the electromagnetic spectrum having wavelength from about $10^{-2}$ to about $10^{-6}$ nm. This electromagnetic radiation must penetrate the IFPL, the double release sheet or the electro-optic device and reach the identification marker to induce a response in a form of a characteristic emission. The emitted radiation from the identification marker must also penetrate out of the FPL the double release sheet, and the electro-optic device to be detectable from the outside of the FPL, the double release sheet, or the electro-optic device. In such scenarios, it is required that the layers of the FPL, the double release sheet, or the electro-optic device to be at least partially light-transmissive to near IR, visible or ultraviolet radiation. The use of identification markers that can be activated by electromagnetic radiation and emit in a characteristic wavelength profile with longer wavelengths (lower energy) enables the authentication of the manufacturing source and the identification of the manufacturing lot of FPL, double release sheet, and devices that are opaque to near IR, visible or ultraviolet radiation. Elements of the lanthanide series of the periodic table, such as europium, gadolinium, terbium and their salts, can serve as identification markers. They can be activated by x rays and gamma rays. X rays and gamma rays readily penetrate the materials that are used in electro-optic devices. Penetration of such high energy electromagnetic radiation is only prohibited by thick metal layers of heavy metals, such as lead. Upon excitation with x rays and gamma rays, lanthanide metals and their salts emit characteristic spectra that can be detected via x ray fluorescence (XRF). The detection limit of XRF is very low (in the ppm range), which means that a very small quantity of a lanthanide metal or its salt is sufficient to enable the authentication of an FPL, a double release sheet, or an electro-optic device. The lanthanide metal or its salt may be present in any of the layers of the FPL, the double release sheet, or the electro-optic device, such as the adhesive layer or the electro-optic material layer, or it may be part of a coating on any layer. In addition to the elements mentioned above (europium, gadolinium, terbium), the lanthanide series include lanthanum, cerium, praseodymium, neodymium, promethium, samarium, dysprosium, holmium, erbium, thulium, ytterbium, and lutetium.

In another variant of the present invention, the identification marker may be present in the FPL, the double release sheet, and the electro-optic device in the form of particles located in the electro-optic material layer. These particles may be charged or uncharged.

As mentioned above, in certain types of electro-optic devices (or FPLs, or double release sheets), the electro-optic material layer comprises an electrophoretic medium having a plurality of a first species of charged particles moving through a fluid under the influence of an electric field, contributing to the different display states, which differ in at least one optical property. The electrophoretic medium may be encapsulated by a plurality of microcapsules having microcapsule shell. Typically, such electro-optic devices comprise a plurality of at least one species of charge particle, but they can comprise multiple species of particles that contribute to a variety of the potential optical states. The encapsulated electrophoretic medium may further comprise a plurality of a second species of charged or uncharged particles, wherein the second species of particles may be the identification marker. The second species of particles can be distinguished from the first species of particles and any other particles present in the electrophoretic medium via visual inspection, microscopic inspection, or spectrometric determination of the electro-optic device (or the FPL, or the double release sheet). Instead of the electrophoretic medium being in the form of microcapsules, it may be present in a plurality of microcells, which are formed using a polymeric material, as described above.

The electro-optic material of an electro-optic device (or a FPL, or a double release sheet) may comprise an electrophoretic medium comprising a plurality of a first and second species of charged particles, moving through a fluid under the influence of an electric field, contributing to the different display states, which differ in at least one optical property. The electrophoretic medium may be encapsulated by a plurality of microcapsules having microcapsule shells. The encapsulated electrophoretic medium may further comprise a plurality of a third species of pigment particles that are part of the microcapsule shells, and the third species of particles may be the identification marker. The third species of particles can be distinguished from the first species of particles, the second species of charged particles and any other particles in the electrophoretic medium via visual inspection, microscopic inspection, or spectrometric determination of the electro-optic device (or the FPL, or the double release sheet).

A typical method of making of encapsulated electrophoretic medium involves the following steps: (a) mixing of an aqueous mixture of gelatin and acacia polymers in the presence of emulsified droplets comprising charged particles in a hydrocarbon solvent; (b) heating the mixture to approximately 40° C. and decreasing the pH to a value of approximately 4.9, causing the formation of microcapsules having a shell comprising a gelatin/acacia coacervate; (c) reducing the temperature of the mixture to approximately 10° C.; (e) adding an aqueous solution of glutaraldehyde to cause the cross-linking of the microcapsule shell; (f) vigorously mixing the mixture for 12 more hours at approximately 25° C.;

(g) increasing the temperature to 50° C. and mixing for an additional 1 hour to remove the excess cross-linking agent; (g) separating out capsules that are larger than 100 μm by sieving. The retained microcapsules are mixed with a polymer binding and coated on the electro-optic electrode to form the electro-optic material layer.

As described above, inclusion of an additional species of charged particle in a small content of the total content of charged particles in electrophoretic media may enable the authentication of the corresponding electro-optic device. In other words, the additional species of charged particle can serve as the identification market in the corresponding FPL, double release sheet, and electro-optic device. To be effective as identification marker, the species of charged particles must be detectable via visual inspection of the electro-optic device (or the FPL, or the double release sheet) or via determination using an analytical instrument, such as an optical microscope. Spectrometric determination by various techniques such as UV-Vis spectroscopy, infrared spectroscopy, x-ray fluorescence, etc. may also be used. Thus, it is preferred that the charged particles identification marker have at least one different property than the other species of charged particle of the electro-optic material layer. They may have different color, different shape, or different size than the other species of charged particle. Alternatively, the charged particles identification marker may be a fluorescent or phosphorescent pigment, which can be detected upon excitation by electromagnetic radiation of specific wavelength by the emission of electromagnetic radiation of a characteristic wavelength profile. In order to avoid the identification marker to significantly interfere with the operation of the electro-optic device and its optical states, it is preferred that the content of the charged particles identification marker is relatively low compared to the total weight content of the charged particle that are present in the electro-optic material layer. Thus, the charged particles identification marker may be from about 0.01 weight % to about 2 weight %, more preferably, from about 0.02 weight % to about 0.5 weight %, even more preferably, from about 0.05 weight % to about 0.2 weight % by weight of the total charged particle content of the electro-optic material layer. A certain protocol of applied electrical field may be utilized to enable the authentication of the device based on charged particles identification marker. For typical visual inspection or optical microscopy determinations, the charged particles must be visible from the surface of the electro-optic material layer.

Figure 4:
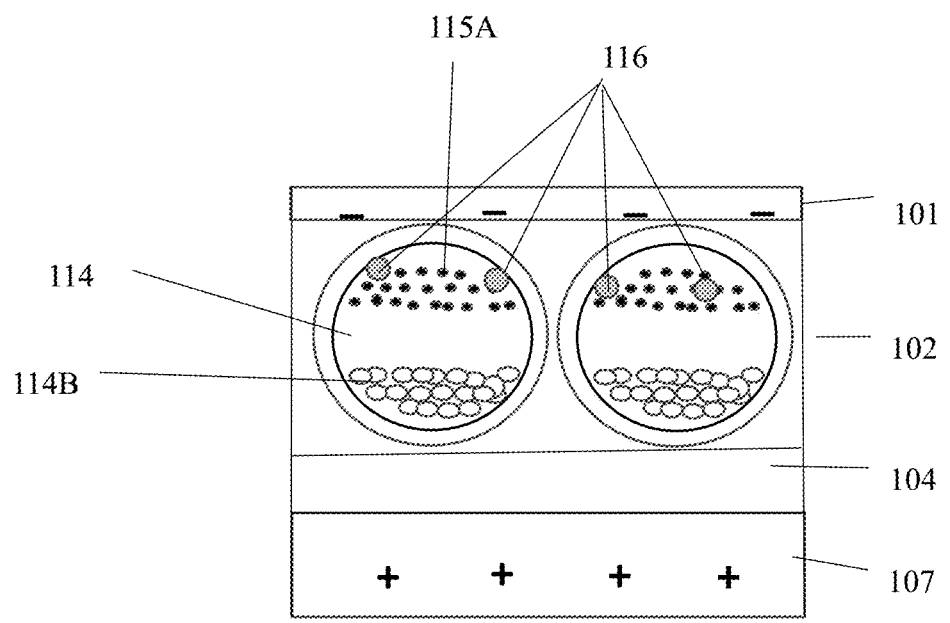
FIG. 4 is an illustration of an electro-optic device with an electrophoretic medium. The electrophoretic medium comprises charged particles as identification marker.

FIG. 4 provides an illustration of an example wherein the identification marker is positively charged particles 116, in an encapsulated electrophoretic medium 114. In this example, the electro-optic medium of the electro-optic layer 102 also comprises black pigment particles that are positively charged 115A and white particles that are negatively charged 114B. Application of electrical field across the electrodes of the device with negative charge on the electrically-conductive light-transmissive electrode 101 causes the positively charged particles 115A and 116 to move close to the viewing side of the electro-optic device and the negatively charged white particles to move towards the opposite side of the electro-optic layer. This enables the visual inspection or spectrometric determination of the charged particles identification marker, authenticating the electro-optic material layer and the corresponding electro-optic device. It is understood by the person skilled in the art that the identification market may also be negatively charged particles.

Inclusion of an additional species of uncharged particle in a small content of the total content of charged particles in electrophoretic media may also enable the authentication of the corresponding electro-optic device (FPL, and double release sheet). It was observed that particles might be driven to be located near the viewing side of the electrophoretic medium even if they do not comprise electrical charges. More specifically, if electric field of high voltage is applied across the electro-optic material layer, the flow of the moving charged particles toward the viewing side of the electrophoretic medium creates a draft, bringing even uncharged particles to a location near the viewing side of the electrophoretic medium. As described above for the case of charged particle identification markers, to be effective as identification marker, it is preferred that the uncharged particles identification marker have at least one different property than the other species of charged particle of the electro-optic material layer. The uncharged particles identification marker may also be a fluorescent or phosphorescent pigment. It is also preferred that the content of the charged particles identification marker is relatively low compared to the total weight content of the charged particle that are present in the electro-optic material layer. Thus, the charged particles identification marker may be from about 0.01 weight % to about 2 weight %, more preferably, from about 0.02 weight % to about 0.5 weight %, even more preferably, from about 0.05 weight % to about 0.2 weight % by weight of the total charged particle content of the electro-optic material layer.

In another variant of the present invention, wherein the electro-optic device comprises encapsulated electrophoretic medium, the identification marker of the present invention may be pigment particles that are part of the shell of the microcapsules of the encapsulated electrophoretic medium. These particles may be charged or uncharged. It was observed that in the case of encapsulation process described above, wherein polar pigment particles are present in the emulsion, some or all the polar pigment particles become part of the shell of the electrophoretic medium rather than being present inside the microcapsules. Visual, microscopic or spectrometric determination of the encapsulated electrophoretic medium may then authenticate the electro-optic material layer and the corresponding electro-optic device (or the FPL). It is preferred that the content of the polar particles identification marker is relatively low compared to the total weight content of the charged particle that are present in the electro-optic material layer. Thus, the charged particles identification marker may be from about 0.01 weight % to about 0.5 weight %, more preferably, from about 0.02 weight % to about 0.3 weight %, even more preferably, from about 0.05 weight % to about 0.1 weight % by weight of the total charged particle content of the electro-optic material layer.

Figure 5:
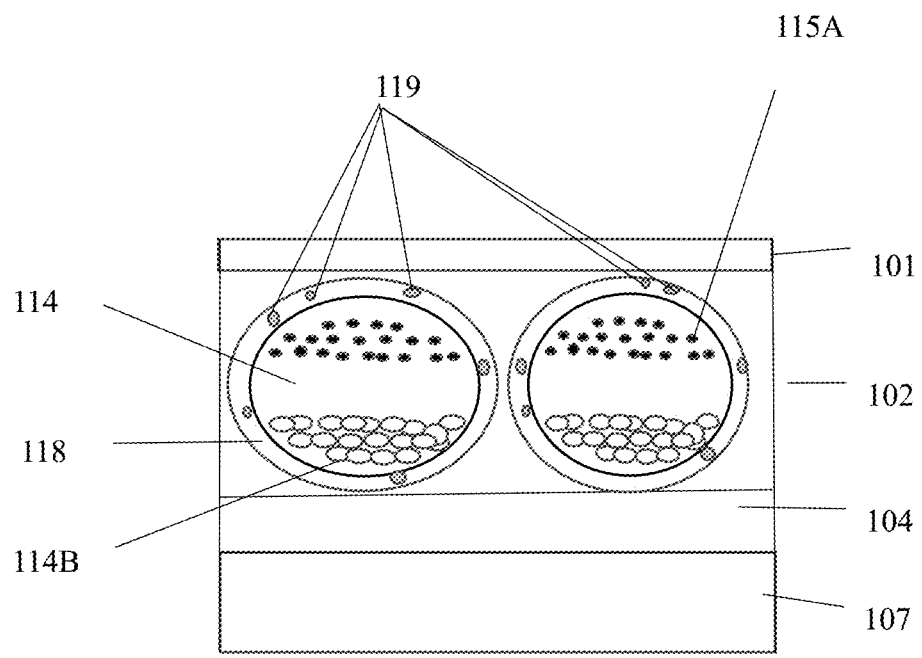
FIG. 5 is an illustration of an electro-optic device with a microencapsulated electrophoretic medium. The shell of the microcapsules comprises particles as identification marker.

FIG. 5 provides an illustration of an example wherein the identification marker (polar pigment particles 119) is present in the shell of an encapsulated electrophoretic medium 114. In this example, the electro-optic medium of the electro-optic layer 102 also comprises black pigment particles 115A and white particles 114B. Visual, microscopic or spectrometric determination of the shell of the microcapsules for the presence of the polar pigment particles may then authenticate the electro-optic material layer and the corresponding electro-optic device.

More than one activation regions can be used in different areas of the electro-optic device, or the FPL, or the double release sheet. This may enable the authentication of different components or materials comprised in the components of the electro-optic device, or the FPL, or the double release sheet. It may also increase the complexity of the applied stimulus or the radiation emission making the authentication protocol more sophisticated, enabling the coding of additional information that can be detected during the lifetime of the FPL, the double release sheet, or the electro-optic device. In addition, the use of combination of two or more identification markers may enable the encoding and retrieval of more information about the electro-optical device, or the FPL, or the double release sheet.

EXAMPLES

An example of the methodology was evaluated according to the following description.

Figure 6A:
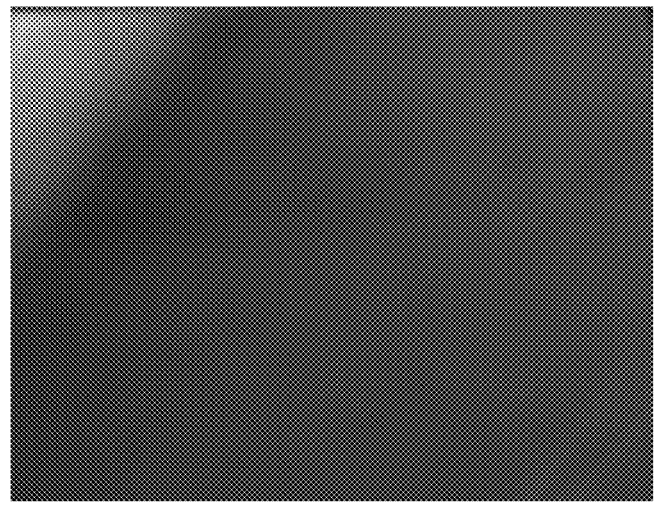
FIGS. 6A, 6B, 6C and 6D are photographic images of an electro-optic device having an activation region, which is a coating on the backplane substrate, wherein the electro-optic device is illuminated (1) by a typical fluorescent light, and (2) by a blue light.
Figure 6B:
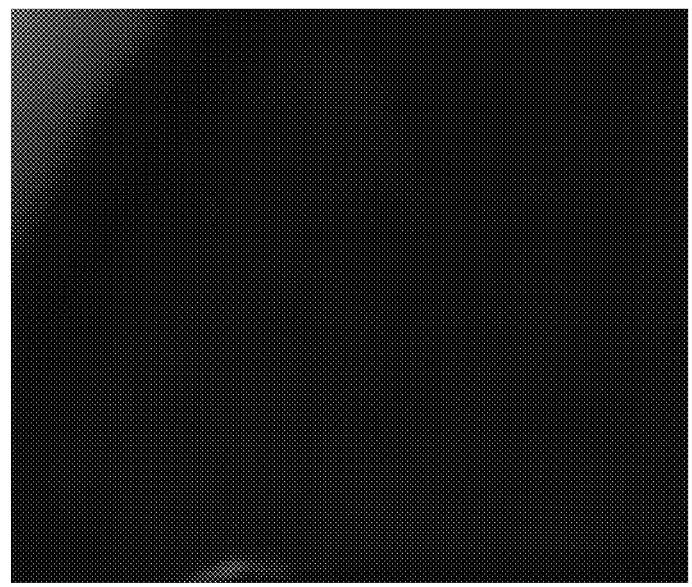
Figure 6C:
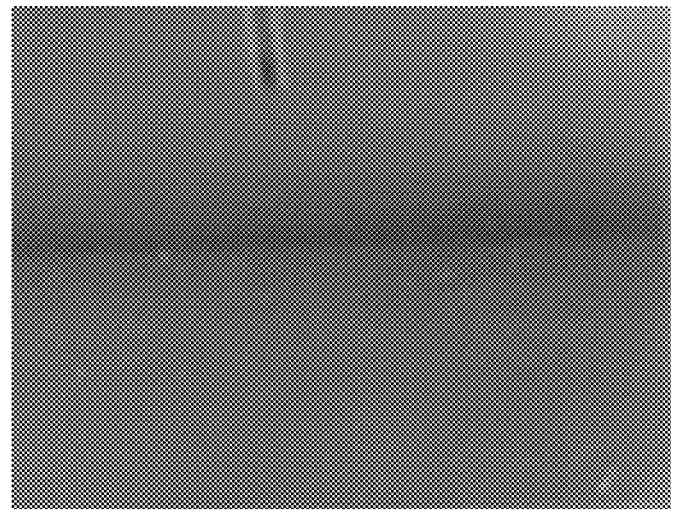
Figure 6D:
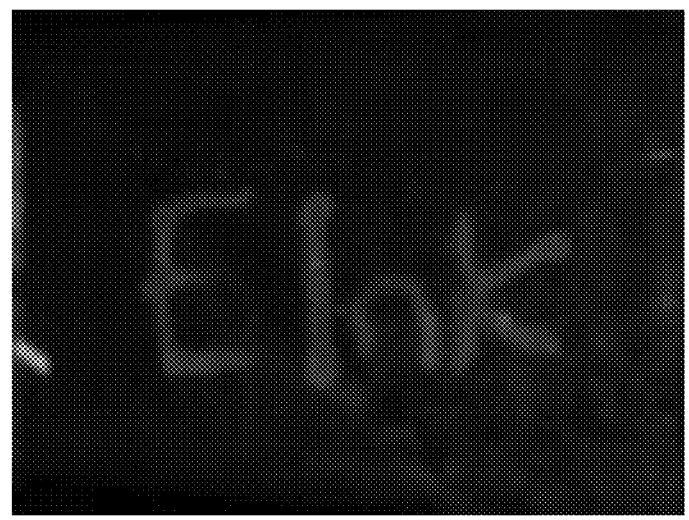

An aqueous dye solution containing 5 weight % of fluorescent dye Lucifer Yellow (supplied by Sigma-Aldrich) by weight of the aqueous dye solution was mixed with equal amount of an aqueous polymer solution containing 5 weight % of poly(vinyl alcohol) by weight of the aqueous polymer solution. The combined solution was coated onto a backplane substrate. The coating was performed so that the words "E Ink" were formed as a latent image on the backplane substrate. Lucifer yellow is a fluorescent dye, which is activated by ultraviolet or blue visible light. This dye, upon activation, emits in the visible region of the electromagnetic spectrum and at a maximum absorption wavelength that is longer than that of blue visible light. A FPL comprising, in order, an electrically-conductive light-transmissive layer, an electro-optic material, an adhesive layer, and a release film, was attached to the backplane substrate, after the removal of the release film. The attachment was performed so that the coating of the fluorescent dye is in contact with the adhesive layer of the FPL. The electrically-conductive light-transmissive layer and the backplane substrate of this electro-optic device were illuminated using a fluorescent lamp (60W, 1050 lumens). Photographic images of the front of the device (electrically-conductive light-transmissive layer) and the back of the device (backplane substrate) were acquired. The images are provided in FIGS. 6A and 6C, respectively. Then, the electrically-conductive light-transmissive layer and the backplane substrate of this electro-optic device were illuminated using blue light. Photographic images of the front of the device (electrically-conductive light-transmissive layer) and the back of the device (backplane substrate) were acquired. The images are provided in FIGS. 6B and 6D, respectively.

The electro-optic material layer of the FPL, which is used in this example, was opaque. Thus, it was not surprising that that no emission of the fluorescent dye was observed from the surface of the electro-optic device where the electrically-conductive light-transmissive electrode is located, independently of the nature of the incident light. In the case of the attempted activation of the fluorescent dye with regular fluorescent bulb, no emission was observed from any surface of the electro-optic device. The incident light that could enter the device from the partially light-transmissive backplane substrate did not have sufficiently high frequency, that is, it does not have sufficiently short wavelength, to activate the fluorescent dye. However, illumination of the backplane substrate with blue light activated the fluorescent dye, which emitted light in the visible light region and at a maximum absorption wavelength that was longer than the wavelength of the blue incident light. This emission was clearly visible by an observer looking at the outside surface of the backplane substrate as the photographic image of FIG. 6D demonstrates. The words "E Ink" can be clearly seen in the photographic image.

Figure 7:
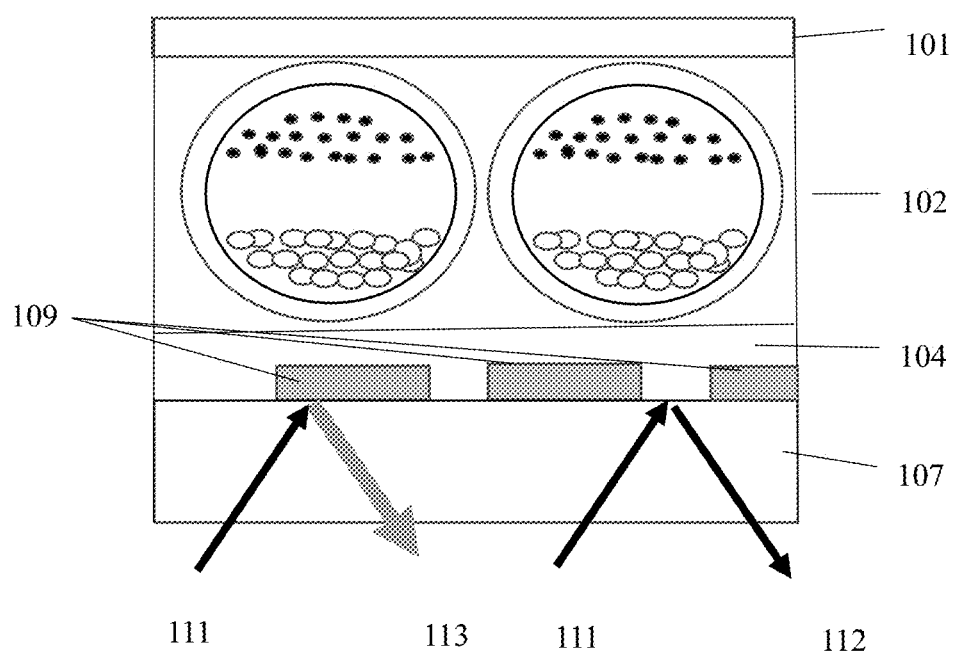
FIG. 7 is an illustration of the interaction of incident light with an electro-optic device. The activation region of the electro-optic device is a coating on the adhesive layer side of the backplane substrate.

A simplified illustration of the concept of the light absorption and emission by the fluorescent dye, which is present in the activation region, is provided in FIG. 7. In this case, the coating 109 on the backplane substrate 107, which is in contact with the adhesive layer 104, comprises the fluorescent dye. The incident blue light 111 activates the fluorescent dye and light of a longer wavelength 113 is emitted, which is visible by the observer. On the contrary, when an incident blue light 111 does not encounter a fluorescent dye in its path, it is reflected back as light 112 of the same wavelength as the incident blue light. This demonstrates how the coating representing an image such as a text ("E Ink"), and the activation with blue light forms the photographic image of FIG. 6D.

The example demonstrates how a fluorescent dye can authenticate an electro-optic device.

The electro-optic device (or the FIL, or the double release sheet) of the present invention may also comprise an identification marker, or a combination of identification markers, comprising filaments, fibers and/or other micro-particles that have a unique, readily detectable, structure. An example of such identification markers are taggants. Taggants are used in explosives, but also in commodity materials and even documents. Preferably, these filaments, fibers and micro-particles are invisible to the naked eye, but they are observable and their features detected by a microscope or they have a unique spectroscopic signal. The invisibility to the naked eye is especially important if the location of the identification marker affects the optical performance of the device, for example, if they affect the transparency of a clear layer. The fibers and/or micro-particles may be coded by selected combinations and concentrations or tagging elements. Tagging elements may include colors/combination of colors, particle shape, metal content, distinct domains created by a combination of polymers, presence of magnetic components, etc. An example of such a taggant is a polymeric micro-particle material, wherein each polymeric micro-particle comprises different segments having different colors. These particles may be detected with a microscope or even with a magnifier. Another example of a taggant is a fiber material that comprises of a variety of fiber components, such as different polymers and other components, melting characteristics, etc. The above examples demonstrate that such multi-component fibers and particles having unique patterns that code simple or complex information for identification purposes. The filaments, fibers and micro-particles representing a code may be included in one or more of the layers or adjacent to a layer of an electro-optic device (or front plane laminate or a double release sheet). This type of identification marker may be useful for the identification or the authentication of devices even after they have been exposed to mechanical or other kind of destructive elements, such as fire or explosion, as the filaments, fibers and micro-particles may be collected from the surrounding area and analyzed.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention. In the event of any inconsistency between the content of this application and any of the patents and application incorporated by reference herein, the content of this application shall control to the extent necessary to resolve such inconsistency.

The invention claimed is:

1. A method of authenticating an electro-optic device and any of its components comprising the steps of:
providing an electro-optic device comprising, in order, an electrically-conductive light-transmissive layer, an electro-optic material layer, a first adhesive layer, and a backplane substrate comprising a plurality of pixel electrodes configured to apply an electrical potential between the electrically-conductive light-transmissive layer and the pixel electrodes, wherein the electro-optic device comprises an activation region having an identification marker that emits radiation of a characteristic wavelength profile upon activation, and wherein the activation region is located within or adjacent to one of the layers of the electro-optic device, wherein the electro-optic material layer comprises an electrophoretic medium, which comprises a plurality of a first species of particles dispersed in a hydrophobic oil, wherein the first species of particles is charged, wherein the electrophoretic medium further comprises a plurality of a second species of particles, wherein the second species of particles is the identification marker, having a content of from about 0.01 weight % to about 2 weight % by weight of the total particle content of the electrophoretic material, and wherein the second species of particles can be distinguished from the first species of particles and any other particles present in the electrophoretic medium via visual inspection, microscopic inspection, or spectrometric determination of the electro-optic device;
activating the identification marker by a stimulus;
detecting the emitted electromagnetic radiation caused by the identification marker; and
determining the authenticity of the electro-optic device or any of its components or determining the manufacturing lot of the electro-optic device or any of its components.

2. The method of authenticating an electro-optic device and any of its components of claim 1, wherein the second species of particles is charged.

3. The method of authenticating an electro-optic device and any of its components of claim 1, wherein the second species of particles is uncharged.

4. The method of authenticating an electro-optic device and any of its components of claim 1, wherein the electrophoretic medium is encapsulated in a plurality of microcapsules having microcapsule shells, wherein a plurality of a third species of pigment particles are part of the microcapsule shells, and wherein the third species of particles is the identification marker, having a content of from about 0.01 weight % to about 0.5 weight % by weight of the total particle content of the electrophoretic material, and wherein the third species of particles can be distinguished from the first species of particles and any other particles in the electrophoretic medium via visual inspection, microscopic inspection, or spectrometric determination of the electro-optic device.

5. The method of authenticating an electro-optic device and any of its components of claim 3, wherein the second species of particle are fluorescent or phosphorescent particles.

* * * * *